(12) United States Patent
Krichen et al.

(10) Patent No.: US 10,078,782 B2
(45) Date of Patent: Sep. 18, 2018

(54) METHOD FOR IDENTIFYING AND/OR AUTHENTICATING AN INDIVIDUAL BY IRIS RECOGNITION

(71) Applicant: MORPHO, Issy les Moulineaux (FR)

(72) Inventors: Emine Krichen, Issy les Moulineaux (FR); Pierre Gacon, Issy les Moulineaux (FR); Stephane Gentric, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 15/181,192

(22) Filed: Jun. 13, 2016

(65) Prior Publication Data

US 2016/0364611 A1 Dec. 15, 2016

(30) Foreign Application Priority Data

Jun. 15, 2015 (FR) ...................... 15 55440

(51) Int. Cl.
*G06K 9/00* (2006.01)
*G06K 9/62* (2006.01)
*G06T 7/11* (2017.01)

(52) U.S. Cl.
CPC ..... *G06K 9/00617* (2013.01); *G06K 9/00604* (2013.01); *G06K 9/6215* (2013.01); *G06T 7/11* (2017.01)

(58) Field of Classification Search
CPC ........... G06K 9/00617; G06K 9/00597; G06K 9/00604; G06K 9/0061; G06K 9/6215;
(Continued)

(56) References Cited

U.S. PATENT DOCUMENTS

| 5,291,560 A * | 3/1994 | Daugman | A61B 5/1171 351/206 |
| 6,229,905 B1 * | 5/2001 | Suzaki | G06K 9/00597 382/110 |

(Continued)

OTHER PUBLICATIONS

Search Report in French Application No. 1555440 dated Feb. 12, 2016, with English translation coversheet. 13 pages.

(Continued)

*Primary Examiner* — Li Liu
(74) *Attorney, Agent, or Firm* — Womble Bond Dickinson (US) LLP

(57) ABSTRACT

A method for identifying and/or authenticating an individual by a system including a storage device storing at least one binary code of a reference iris and a binary code of an associated reference mask: acquisition of an image of an eye of the individual, segmentation of the acquired image to isolate a region containing the texture of the iris and determine an associated mask, division of the region and the mask into N2 concentric rings, normalization of the region, determination of a binary iris code IC and a binary code of mask IM matching at least one ring of the iris with a ring of the reference iris to minimize a matching distance between the acquired image and the reference image, computation of the minimized matching distance, identification and/or authentication of the individual if the minimized matching distance is less than a predetermined threshold.

12 Claims, 8 Drawing Sheets

(58) Field of Classification Search
CPC .... G06K 9/00073; G06K 9/4609; G06K 9/52; G06F 21/32; G06T 7/11; H04L 9/3231
See application file for complete search history.

(56) References Cited

U.S. PATENT DOCUMENTS

| | | | |
|---|---|---|---|
| 7,155,035 B2* | 12/2006 | Kondo | G07C 9/00158 340/5.52 |
| 2002/0118864 A1* | 8/2002 | Kondo | G06K 9/0061 382/117 |
| 2008/0219515 A1* | 9/2008 | Namgoong | G06K 9/0061 382/117 |
| 2008/0235515 A1* | 9/2008 | Yedidia | G06K 9/00073 713/186 |
| 2010/0202669 A1* | 8/2010 | Hollingsworth | G06K 9/00617 382/117 |
| 2011/0249872 A1* | 10/2011 | Monro | G06K 9/0061 382/117 |
| 2014/0301611 A1* | 10/2014 | Cremer | G06K 9/0061 382/117 |
| 2015/0320311 A1* | 11/2015 | Chen | A61B 3/14 351/206 |

OTHER PUBLICATIONS

Uhl et al. "Enhancing Iris Matching Using Levenshtein Distance with Alignment Constraints." Advances in Visual Computing, Springer Berlin, Heidelberg, Berlin, Nov. 29, 2010. pp. 469-478 (10 pages).

Ma et al. "Efficient Irish Recognition by Characterizing Key Local Variations." IEEE Transactions on Image Processing, IEEE Service Center, Piscataway, NJ, U.S., vol. 13, No. 6, Jun. 1, 2004. pp. 739-750. 10 pages.

Masek. "Recognition of Human Iris Patterns for Biometricial Identification." http://144.122.166.80/reading/texts/iris_recog/LiborMasekThesis.pdf(2003). 61 pages.

\* cited by examiner

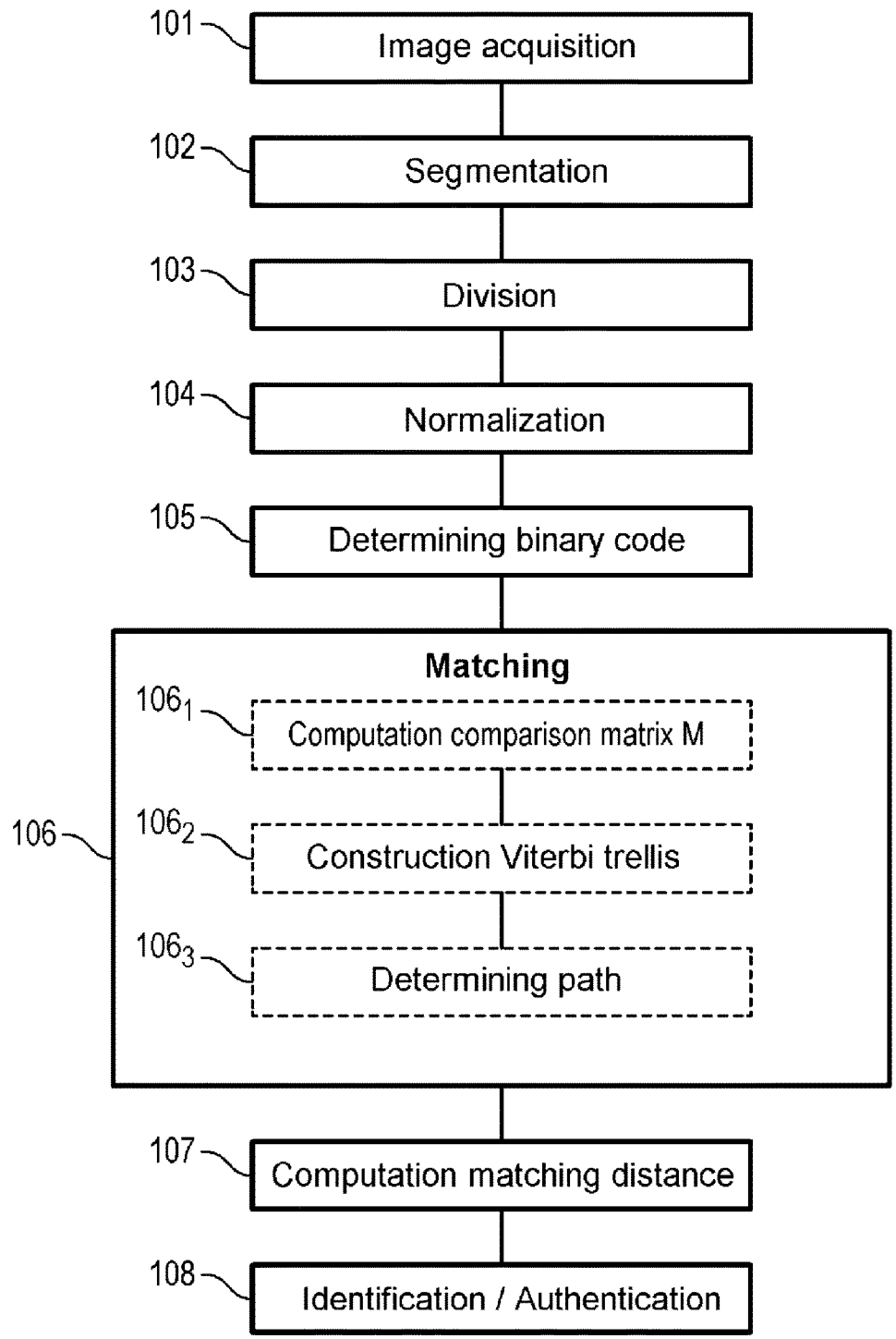

US 10,078,782 B2

METHOD FOR IDENTIFYING AND/OR AUTHENTICATING AN INDIVIDUAL BY IRIS RECOGNITION

GENERAL TECHNICAL FIELD

The invention relates to an improved biometric identification or authentication method by iris recognition.

STATE OF THE ART

To compare the iris of an individual to iris data stored in a reference database, the iris of this individual must be characterized digitally. A process commonly employed for this is the method by Daugman (U.S. Pat. No. 5,291,560). This process provides for the image of the eye to be analyzed to be segmented to isolate the part of the image corresponding to the iris of the individual, as illustrated in FIG. 1. For this image part to be compared to the reference iris data, the zone of the iris to be analyzed can then be cut into a certain number of angular zones, and cut radially into a certain number of rings, as illustrated in FIG. 2.

To effectively compare the iris to be analyzed to reference irises despite variable dilation according to the shooting conditions, the image of the iris to be analyzed can be normalized in the form of a rectangular image of fixed size, thereby transforming the Cartesian coordinates of the image of origin into polar coordinates, as illustrated in FIGS. 3a to 3c. To transform this normalized image into binary code, called iris code, filtering, for example Gabor filtering, can be applied to various zones of this image, for example to each zone corresponding to the intersection of a ring and an angular sector. A binary value 0 or 1 can be attributed to each zone as a function of the sign of the result of the filtering on this zone. Such a binary code can then be easily compared bit-by-bit to one or more binary reference codes stored in a database for identifying or authenticating the individual whose iris has been analyzed. Such binary comparison boils down to comparing zones of the iris positioned at the same position in the normalized image to each other. It should be noted that the left and right edges of the normalized image correspond in reality to adjacent zones of the iris and must be considered as such in analyses following normalization.

Such normalization could perfectly compensate linear dilation/contraction of the iris as a function of luminosity. In practice dilation of the observed iris is far from being linear. A ring of the iris can be found at different positions in the normalized image as a function of the dilation of the pupil. In this case, bit-by-bit comparison of the binary codes can then boil down to comparing zones of the normalized images to each other which do not in fact correspond to identical zones of the iris. Also, movement of the iris during dilation of the pupil happens three-dimensionally. Some rings of the iris can appear or disappear during dilation due to overlapping of different zones of the iris.

Complex models have been proposed for more finely modeling movement of the iris as a function of dilation such as the model by Wyatt (Harry Wyatt, "*A minimum wear-and-tear meshwork for the iris*", Vision Research 40 (2000) 2167-2176). But such a model does not consider the appearance or disappearance of zones of the iris. Such a model as the model by Clark (A. Clark, S. Kulp, I. Herron and A; Ross, "*A theoretical model for describing iris dynamics*", Handbook of Iris Recognition, pp. 129-150, 2013) takes into account both a non-linear variation of the iris and appearance/disappearance of some zones of the iris. However, prediction of the movement of the iris by such a model is a function of a parameter, called Poisson parameter, the value of which varies from one individual to another. It is therefore necessary, in order to be able to recognize an individual by his iris by means of such a model, to perform a specific learning for determining the value of the Poisson parameter for this individual.

In the article ("Inmaculada Tomeo-Reyes, Arun Ross, Antwan D. Clark, Vinod Chandran", A Biomechanical Approach to Iris Normalization) the authors propose a normalization methodology of the texture of the iris based on the model by Clark. As indicated by the authors, this methodology requires knowledge of the dilation ratio of the pupil of the reference image for normalizing the test image. If this approach can be acceptable for a verification scenario (where the reference image is known), it becomes impossible to execute for an identification scenario (where the reference image to be compared is unknown). The authors have also fixed the Poisson parameter at 0.49 for all people.

To limit dependence on such complex models of dilation of the iris, identification or authentication methods by iris recognition have been provided in which dilation of the pupil is not taken into account during the normalization step but during the comparison step of the binary codes. During comparison of two images of iris, such models generally attempt to determine the most probable movement of the rings of the iris between these two images from the iris codes before computing a distance between the images from the iris codes by taking into account this movement. Each zone of the iris in the normalized image is no longer necessarily compared to the corresponding zone of the reference image but can be compared to a zone of this image which corresponds to it best. Such comparison better considers the non-linear nature of the movement of the iris as a function of the dilation of the pupil. It can also take into account the appearances or disappearances of some zones of the iris. The distance between the compared binary codes can be reduced, consequently improving the efficacy of the recognition method. By way of example the method described in Uhl&Wild (Andreas Uhl, Peter Wild, "*Enhancing Iris Matching Using Levenshtein Distance with Alignment Constraints*", In G. Bebis, R. Boyle, B. Parvin, D. Koracin, R. Chung, R. Hammoud, editors, Advances in Visual Computing: 6th International Symposium, (ISVC 2010) pp. 469-479, LNCS, 6453, Springer Verlag, 2010) proposes comparing bit-by-bit the binary codes of an image to be analyzed and a reference image, and taking into account during non-concordance between these codes the possibility that the latter is the result of insertion or disappearance of a zone of iris in one of the images, or else substitution between the zones of iris corresponding to the bits shift between these two images. Since each operation has a predetermined cost, the method proposes determining the set of operations for substitution, disappearance and appearance to explain the differences between the compared iris codes for the lowest cost. But the defect of such a method is processing the binary codes bit-by-bit and not considering the correlation of the movement from a zone of the iris and the other zones belonging to the same ring of the iris. Such correlation is important due to the isotropic nature of the movement of the iris. Such bit-by-bit processing greatly heightens the probability of false positives during comparison of two images of iris of different individuals.

There is therefore a need for an effective identification or authentication method of an individual by iris recognition taking into account the non-linear nature of the displacement of the iris as well as the appearance or the disappearance of some zones of the iris as a function of pupil dilation, and benefiting from the isotropic nature of this movement, without needing specific learning to this individual.

PRESENTATION OF THE INVENTION

According to a first aspect the present invention relates to a method for identifying and/or authenticating an individual comprising the following steps performed by a system for identifying and/or authenticating an individual, said system for identifying and/or authenticating an individual comprising a storage device storing at least one binary code of a reference iris obtained from a reference iris image divided into a first predetermined number N1 of concentric rings, and a binary code of associated reference mask identifying regions of the reference iris in which eyelids, eyelashes, reflections or other sources of noise have been detected:

acquisition of an image of an eye of the individual to be identified and/or authenticated, segmentation of the acquired image of the eye so as to isolate a region containing the texture of the iris and determine an associated mask, division of said region containing the iris texture and of said mask into a second number N2 of concentric rings, normalization of said region containing the texture of the iris and of said mask of Cartesian coordinates into polar coordinates, determination of a binary iris code IC of size equal to N2*P*F coding said region containing the texture of the normalized iris and a binary code of mask IM of size equal to N2*P*F coding the associated mask, by application of a third predetermined number of Gabor filters F to each position from a fourth predetermined number P of positions of each ring, matching at least one ring of the iris of the acquired image with a ring of one of said reference irises so as to minimize a matching distance between the acquired image and the reference image, said matching distance being obtained from the determined and stored reference iris codes and associated mask codes by computing a sum of distances between each of said rings of the matched acquired image iris and the ring of the reference iris which corresponds to it, computation of said minimized matching distance, identification and/or authentication of the individual if said minimized matching distance is less than a predetermined threshold.

The matching step can implement a Viterbi algorithm.

The matching step can comprise:

a computation of a comparison matrix M of size N1*N2, each coefficient $M(i,j)$ of said comparison matrix coding the result of the comparison between the $i^{th}$ ring of the stored reference iris and the $j^{th}$ ring of the iris of the acquired image by means of said determined and reference iris codes and the associated mask codes, construction of a Viterbi trellis wherein the cost for each match of a ring i of the reference iris and of a ring j of the iris of the acquired image is:

for $i = 1$, $\text{Cost}(i, j) = \text{Prob}(i, j) * M(i, j)$ for any $i > 1$: $\text{Cost}(i, j) = \text{Prob}(i, j) * M(i, j) +$ $\min_{L=li:ls \text{ and } k=kmin:kmax} (\text{ProbT}((i, j), (i-L, j+K)) * \text{Cost}(i-L, j+k))$ with:

li, ls, kmin, kmax predetermined relative integers, with li≥1 and 0<j+k≤N2, $\text{Prob}(i,j)$ a predetermined match probability of the $i^{th}$ ring of the reference iris and of the $j^{th}$ ring of the iris of the acquired image, $\text{ProbT}((i,j),(p,q))$ a predetermined match probability of the $p^{th}$ ring of the reference iris and of the $q^{th}$ ring of the iris of the acquired image considering matching of the $i^{th}$ ring of the reference iris and of the $j^{th}$ ring of the iris of the acquired image, determination of a path in said Viterbi trellis comprising:

matching a $M^{th}$ ring of the reference iris with the Path $(M)^{th}$ ring of the iris of the acquired image where Path(M) is the index belonging to [1; N2] minimizing on j (Cost(M,j)), with M an integer less than or equal to the first predetermined number N1, matching at least one other ring of the reference iris of index M' with a ring of the iris of the acquired image of index Path(M'), where M'<M, as a function of a ring of the reference iris of index D already matched with a ring of the iris of the acquired image of index Path(D) with M'=D−Z(D, Path(D), 1) and Path(M')=Path(D)+ Z(D, Path(D), 2), the function Z being defined from $R^3$ in R such that Z(i,j,1) and Z(i,j,2) are respectively the integers L∈[li,ls] and k∈[kmin,kmax] minimizing the function ProbT((i,j),(i−L,j+k))*Cost(i−L,j+k).

Computation of the minimized matching distance can be carried out by means of the formula $$HD_{Viterbi} = \text{MIN}_{t=-T:T} \frac{\sum_{i=1}^{N} \text{Dist}(i, \text{Path}(i), t)}{1 + \sum_{i=1}^{N} \text{Mask}(i, \text{Path}(i), t)}$$

with:

T a predetermined maximum tolerance to a rotation between the acquired image and the reference image, IC1, IC2, IM1 and IM2, matrices of size N1×(P*F) or N2×(P*F) corresponding respectively to the code of the reference iris, the code of the iris of the acquired image, and the associated mask codes, $\text{Dist}(i,j,t) = \sum_{p=1}^{P} \sum_{f=0}^{F-1} |IC1(i,p+f) - IC2(j,p+t+f)|$, $\text{Mask}(i,j,t) = \sum_{p=1}^{P} \sum_{f=0}^{F-1} IM1(i,p+f) * IM2(j,p+t+f)$ The individual can be identified or authenticated by iris recognition by taking into account the non-linear nature of the displacement of the iris and the appearance or the disappearance of some zones of the iris as a function of the dilation of the pupil, and benefiting from the isotropic nature of this movement, without needing specific learning to this individual.

Each coefficient $M(i,j)$ of said comparison matrix M can be the result of a transformation LT of the ratio between Dist(i,j,t) and Mask(i,j,t) for a fixed t.

Such transformation quantifies the degree of resemblance between each of the rings of the reference iris and of the iris of the acquired image, without taking into account the zones of the images perturbed by the presence of obstacle or noise.

Said concentric rings can vary in thickness.

This adapts the thickness of the rings to the radial variability of the iris texture which can be homogeneous over a considerable radial distance by places of the iris and vary rapidly radially on other portions of the iris.

At least two of said concentric rings can overlap.

Matching the rings of two images takes into account the disappearance or the appearance in an iris of a crown of thickness less than that of a ring.

The probabilities ProbT and Prob can be determined by automatic learning or by using a distortion model of the texture of the iris.

The probabilities ProbT and Prob can be a function of the level of dilation of the pupil.

This uses functions adapted to dilation of the pupil noticed in the acquired image and produces functions more adapted than generic functions which would be defined irrespective the level of dilation.

According to a second aspect the present invention relates to a computer program product comprising code instructions for execution of a method for identifying and/or authenticating an individual according to the first aspect when this program is executed by a processor.

According to a third aspect the present invention relates to a data-processing device characterized in that it is likely to be connected to a storage device storing at least one binary code of a reference iris obtained from a reference iris image divided into a first predetermined number N1 of concentric rings, and a binary code of associated reference mask identifying regions of the reference iris in which eyelids, eyelashes, reflections or other sources of noise have been detected and in that it comprises:

a communications interface configured to receive an acquired image of an eye of an individual to be identified and/or authenticated;

a computer configured to:
  segment the image of the eye received so as to isolate a region containing the texture of the iris and determine an associated mask,
  divide said region containing the iris texture and said mask into a second number N2 of concentric rings,
  normalize said region containing the texture of the iris and said mask of Cartesian coordinates into polar coordinates,
  determine a binary iris code IC of size equal to N2*P*F coding said region containing the texture of the normalized iris and a binary code of mask IM of size equal to N2*P*F coding the associated mask, by application of a third predetermined number of Gabor filters F to each position from a fourth predetermined number P of positions of each ring,
  match at least one ring of the iris of the acquired image with a ring of one of said reference irises so as to minimize a matching distance ($HD_{viterbi}$) between the acquired image and the reference image, said matching distance being obtained from the determined and stored reference iris codes and associated mask codes by computing a sum of distances (Dist) between each of said rings of the matched acquired image iris and the ring of the reference iris which corresponds to it,
  compute said minimized matching distance,
  compare said minimized matching distance to a predetermined threshold.

According to a fourth aspect the present invention relates to a system for identifying and/or authenticating an individual comprising:

a storage device storing at least one binary code of a reference iris obtained from a reference iris image divided into a first predetermined number N1 of concentric rings, and a binary code of associated reference mask identifying regions of the reference iris in which eyelids, eyelashes, reflections or other sources of noise have been detected, an image capture device configured to acquire an image of an eye of the individual to be identified and/or authenticated, a data-processing device according to the third aspect configured to minimize a matching distance ($HD_{viterbi}$), between the acquired image and the reference image, and to identify and/or authenticate the individual if said minimized matching distance is less than a predetermined threshold.

Such computer program product, processing device and system for identifying and/or authenticating an individual have the same advantages as those mentioned for the method according to the first aspect.

PRESENTATION OF FIGURES

Other characteristics and advantages will emerge from the following description of an embodiment. This description will be given in reference to the appended drawings, in which.

Figure 4:
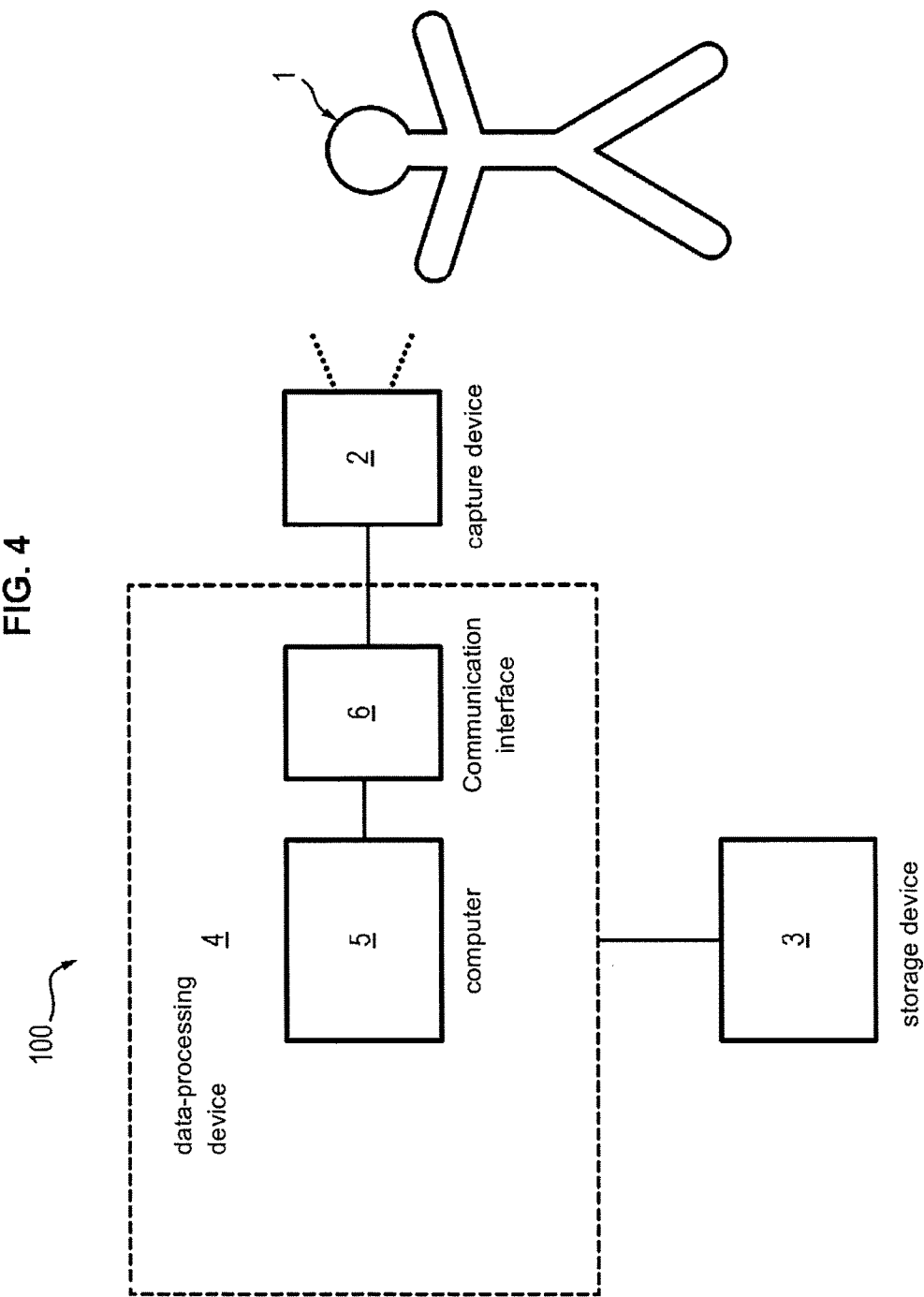
Figure 6A:
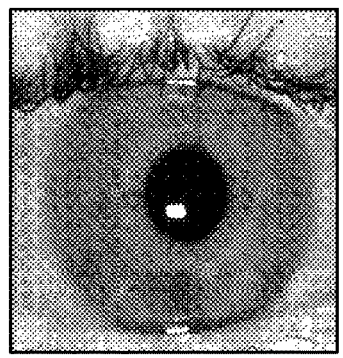
Figure 6B:
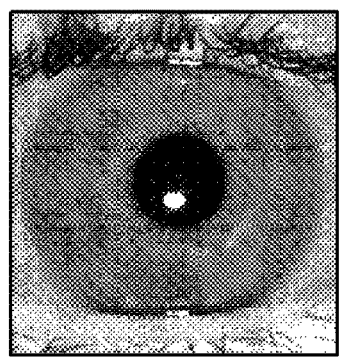
Figure 6C:
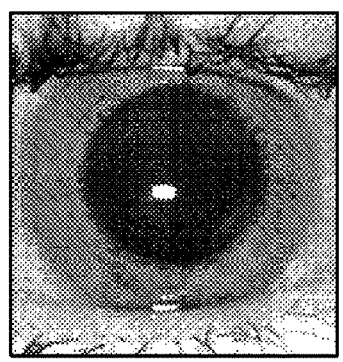
Figure 6D:
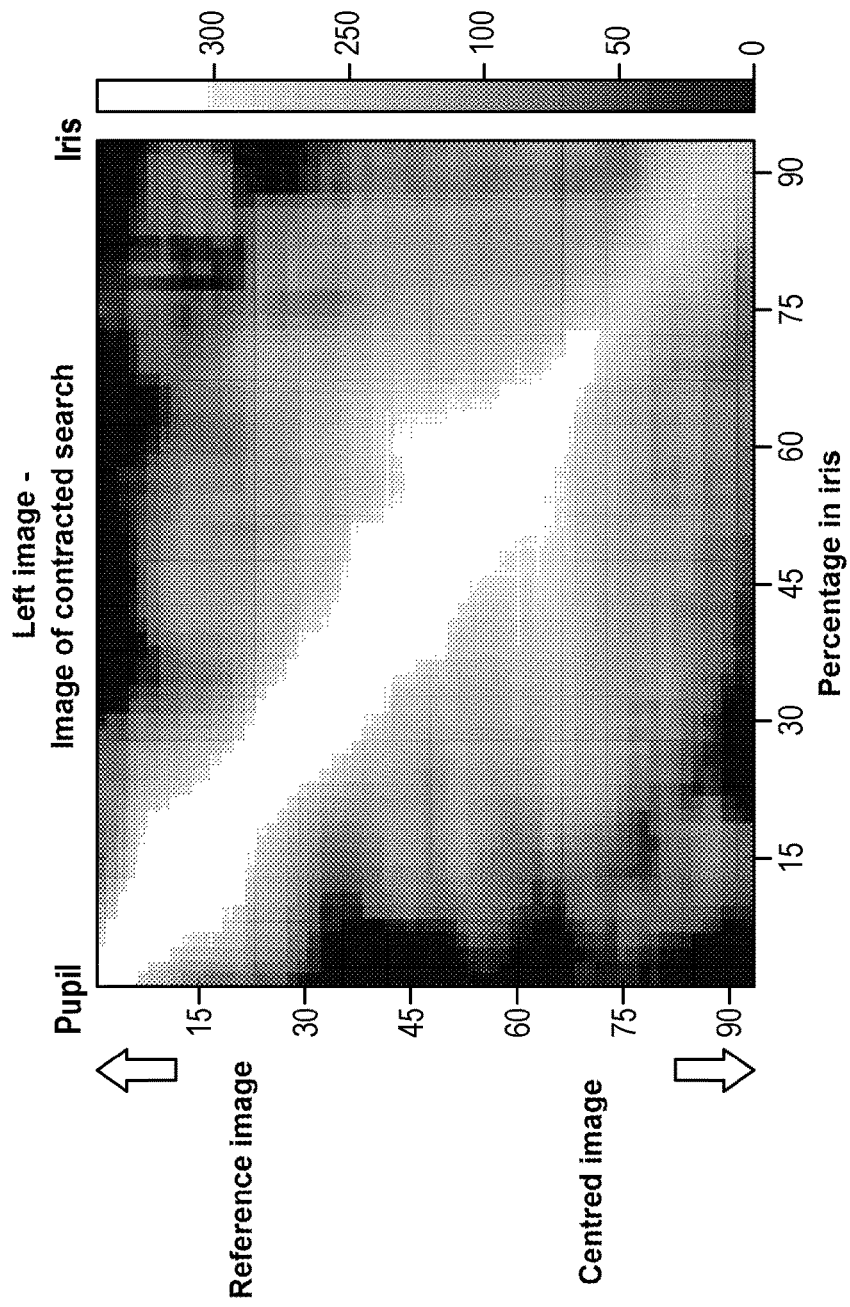
Figure 6E:
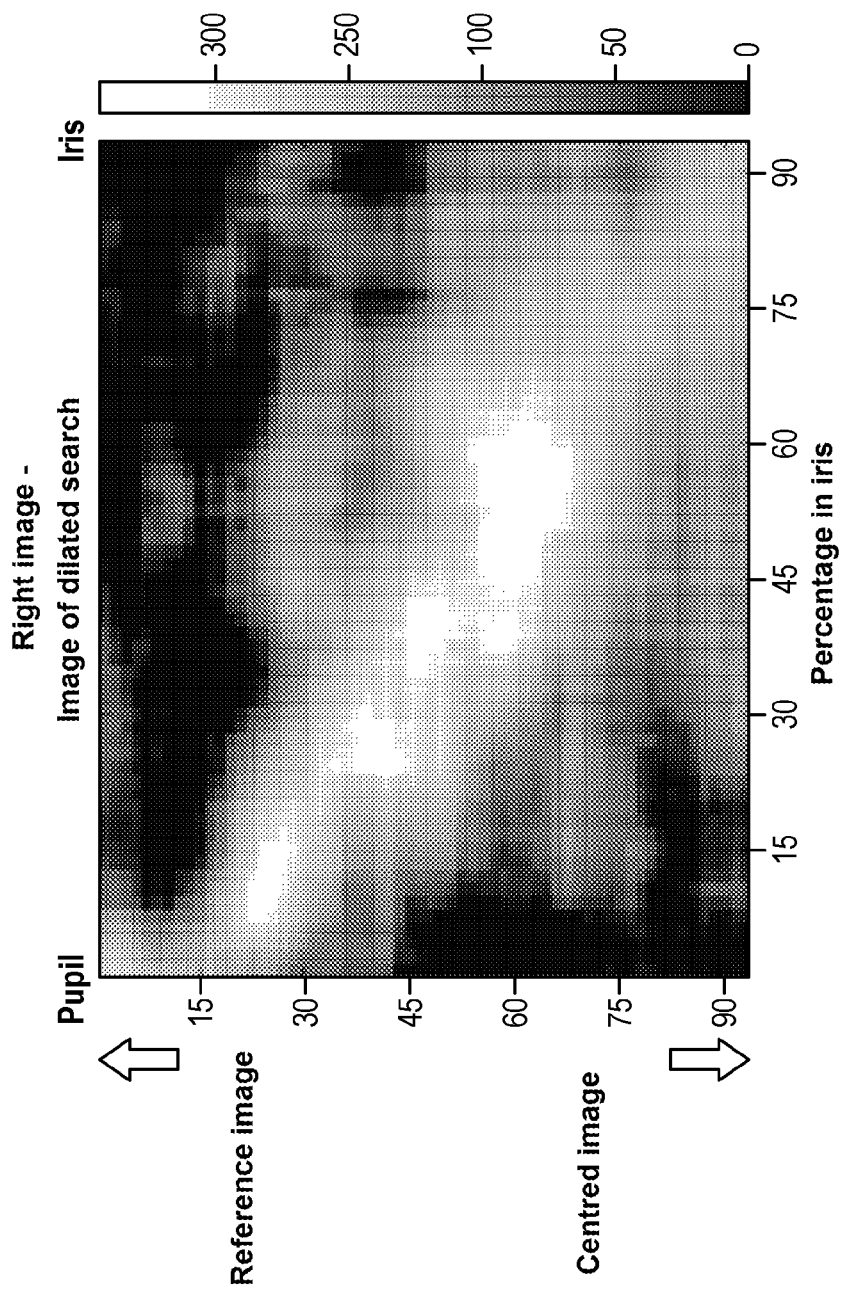
Figure 7:
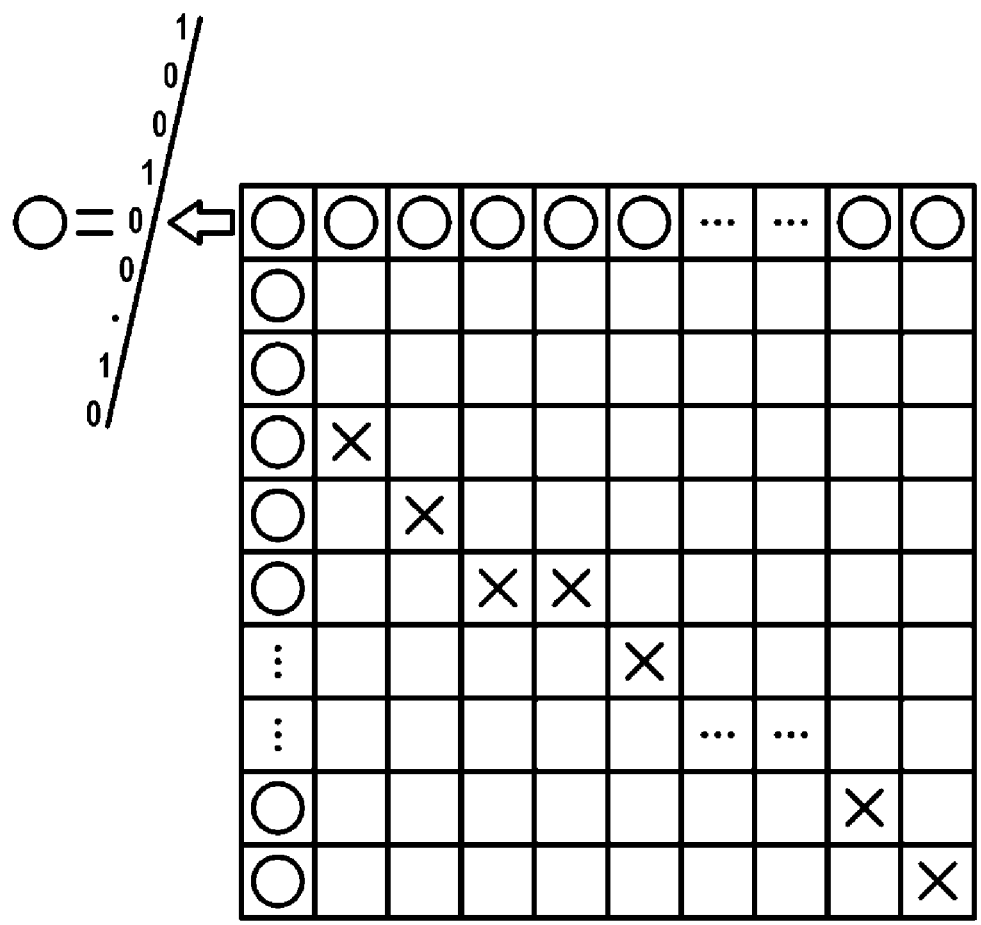

FIG. 4 schematically illustrates hardware means in a system for identifying and/or authenticating an individual according to an embodiment of the invention;

FIG. 5 is a diagram showing a method for identifying and/or authenticating an individual according to an embodiment of the invention;

FIGS. 6a to 6c illustrate images of an eye of an individual having different dilations of pupils;

FIGS. 6d and 6e illustrate examples of comparison matrices corresponding to the comparison of two eye images having pupil dilation illustrated respectively in FIGS. 6a and 6b and in FIGS. 6a and 6c;

FIG. 7 illustrates implementing determination of a path in said Viterbi trellis.

DETAILED DESCRIPTION

An embodiment of the invention relates to a method for identifying and/or authenticating an individual 1 implemented by a system 100 for identifying and/or authenticating an individual, illustrated in FIG. 4.

Such a system 100 comprises an image capture device 2 dedicated to acquisition of biometric data used to identify or authenticate the individual 1. Such biometric data can especially consist of an image of an eye of the individual 1. The image capture device 2 can especially consist of a photographic unit or a camera capturing an image in the visible field or in the infrared field.

The system 100 further comprises a storage device 3. Such a storage device is configured to store at least one binary code of a reference iris obtained from a reference iris image divided into a first predetermined number N1 of concentric rings, and a reference binary code of associated mask identifying regions of the reference iris in which eyelids, eyelashes, reflections or other sources of noise have been detected. It can be any type of read-only memory such as Flash memory or a hard drive. Such a storage device can store such binary codes in the form of a database.

These reference iris images are iris images of individuals recorded in the system so they can be identified or authenticated by the latter. These reference iris images have been processed to obtain the corresponding reference iris codes. The processing applied to these images is the same as those described hereinbelow and applied to the image of the iris of the individual to be authenticated acquired by the image capture device 2.

The system 100 also comprises a data-processing device 4 configured to process the image of the iris of the individual 1 acquired by the image capture devices 2 to deduce therefrom a corresponding iris code and compare it to the stored reference iris codes. Such processing especially comprises cutting of the iris into a second predetermined number N2 of concentric rings. Said processing device is connected to the image capture device 2 and the storage device 3. Such a data-processing device can comprise a computer 5 and a communications interface 6. Such a computer 5 can consist of a processor or microprocessor of type x-86 or RISC for example, a controller or microcontroller, a DSP, an integrated circuit such as an ASIC or programmable circuit such as a FPGA, a combination of such elements or any other combination of components performing the computation steps of the method described hereinbelow. Such a communications interface 6 can be any interface, analog or digital, letting the computer 5 exchange information with the other elements of the system 100 described hereinabove. Such an interface can for example be a RS232 serial interface, a USB, Firewire, HDMI interface or a wired or wireless communications network interface of Ethernet or Wifi type. In an embodiment said processing device, the image capture device 2 and the storage device 3 can be integrated into a common casing, for example in the case of integration in a portable telephone or in an integrated access control system controlling opening of an issue. Alternatively, one or more of these devices can be remote from the device or other devices, for example the image capture device 2 consists of a surveillance camera attached by way of a communications network to a processing device consisting of a central server of a computer system.

The invention proposes improving comparison of the image of the iris of an individual to be identified or authenticated and an image of a reference iris by determining optimal matching between the rings of the iris in an acquired image of the eye of the individual and the rings of the reference iris. Such matching considers the distortion of the iris between the acquired image and the reference image due to dilation of the pupil. This dilation can itself be the consequence of a difference in light exposure between the capture of the two images. The method does not necessarily match all the rings of both irises so that it can consider any appearances or disappearances of rings during distortion of the iris.

More precisely, such optimal matching is determined so as to minimize a distance, so-called matching distance ($HD_{viterbi}$), between the acquired image and the reference image. This distance is computed from the iris code determined for the acquired image and the reference iris code by taking into account the selected matching between the rings of the iris. Such matching is determined in an embodiment by means of a Viterbi algorithm.

The method for identification and/or authentication can be implemented according to the steps illustrated in FIG. 5.

During an acquisition step 101, an image of the eye of the individual 1 is acquired by the image capture device 2. This image can be in two dimensions or in three dimensions, in color or in black and white. In the case of a digital image, this image can be encoded according to various formats such as bitmap, jpeg, png, tiff, raw . . . formats. In the case of an image in black and white this can include a certain number of levels of grey.

Then the data-processing device performs steps of segmentation 102, division 103, normalization 104, determination of binary codes 105, matching 106 and computation of distance 107.

Figure 1:
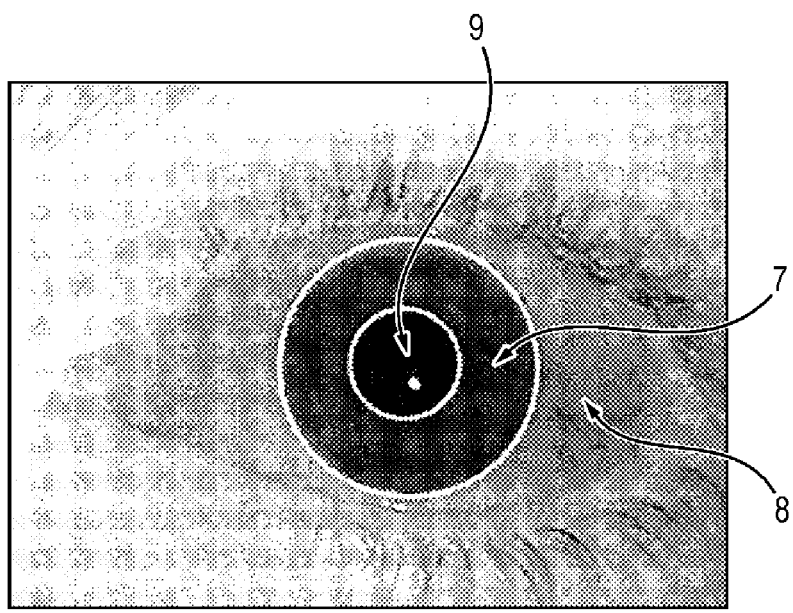
FIG. 1 illustrates implementing a segmentation step of an image of an eye of an individual to be identified/authenticated.

During a segmentation step 102, the acquired image of the eye is segmented so as to isolate a region containing the texture of the iris. In FIG. 1 this is the region 7 between the circles. The region of iris is isolated from the white of the eye 8 and the pupil 9. During this step an associated mask identifying regions of the iris in which eyelids, eyelashes, reflections or other sources of noise have been detected can also be determined. Such a mask can especially identify a region of the eye in which a light spot is reflected, intended to impose predetermined light exposure during acquisition of the image of the eye.

Figure 2:
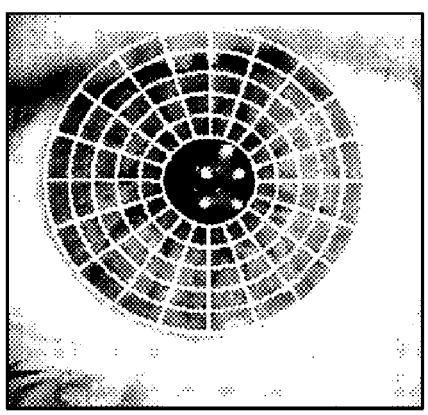
FIG. 2 illustrates implementing a division step of the texture of an iris into concentric rings and angular sectors.

During a division step 103, said region containing the iris texture and said mask can be divided into N2 concentric rings as illustrated in FIG. 2. These concentric rings can be of constant or varied thicknesses.

These concentric rings can also overlap. In this case, matching the rings of two images takes into account the disappearance or appearance in an iris of a crown of thickness less than that of a ring.

Figure 3A:
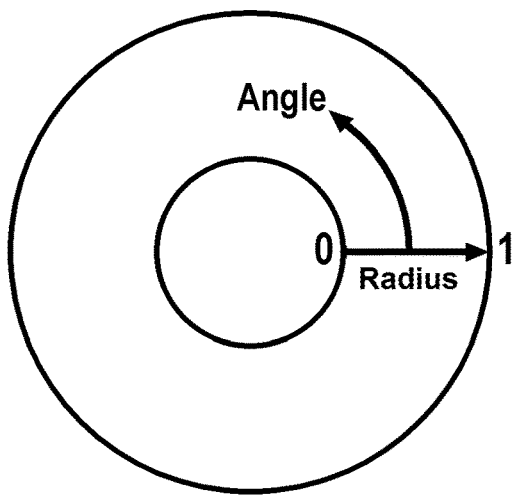
FIGS. 3a to 3c illustrate implementing a normalization step of a region containing the texture of an iris.
Figure 3B:
Figure 3C:
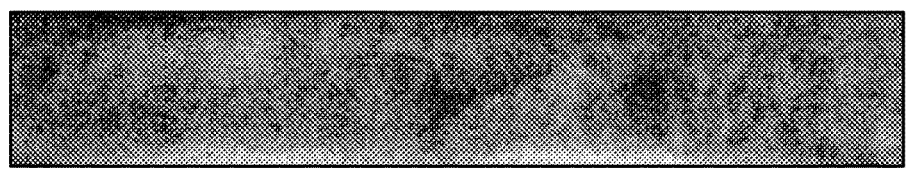

During a normalization step 104, the region containing the texture of the iris and said mask originating from the segmentation and division steps 102 and 103 are normalized in the form of a rectangular image of fixed size, thereby transforming the Cartesian coordinates of the image of origin into polar coordinates, as illustrated in FIGS. 3a to 3c following polar transformation proposed by Daugman: $I(x(r,\theta), y(r,\theta)) \rightarrow I(r,\theta)$ with I the acquired image of iris.

In this normalized image, the subdivision rings of the iris form lines. To transform this normalized image into binary code, so-called iris code, filtering by a third predetermined number of filters F can be applied during a step for determination of binary code F 105 to each position among a fourth predetermined number P of positions of each ring. The iris can for example be subdivided angularly into P angular regions and such filtering can be applied to each zone corresponding to the intersection of a ring and an angular sector. In the normalized image of the iris each of these angular sectors constitutes a column. Such filters can be Gabor filters, characterising the variations in luminosity of the texture of the iris in the zone to which it is applied. A binary value 0 or 1 can therefore be attributed to each position as a function of the sign of the result of the filtering at this position. A similar operation can be performed on the mask related to the acquired image. A binary iris code IC of size equal to N2*P*F coding said region containing the normalized and filtered iris texture can thus be determined. A binary mask code IM of size equal to N2*P*F coding the associated mask can also be determined. These binary codes can be formed from two matrices of size N2×(P*F) each line of which corresponds to a ring (as in the normalized image) and each group of P columns corresponds to an angular sector of the iris image. The line 1 of each of these matrices can for example be associated with the ring closest to the pupil. In an embodiment N1 can be equal to N2 and can for example be equal to 8. By way of example, the iris can be subdivided into 32 rings and into 64 angular regions and the number of filters applied to each position can be equal to 4.

Then, during a matching step 106 at least one ring of the iris of the acquired image is matched with a ring of one of said reference irises so as to minimize a distance, so-called matching distance ($HD_{viterbi}$), between the acquired image and the reference image, said matching distance being obtained from the determined and stored reference iris codes and the associated mask codes by computing a sum of distances (Dist) between each of said at least one ring of the matched acquired image iris and the ring of the reference iris which corresponds to it. The matching step 106 can implement a Viterbi algorithm.

More precisely the matching step 106 comprises the following steps.

A comparison matrix M of size N1*N2 is first computed $106_1$. This comparison matrix reflects the degree of resemblance of each of the N2 rings of the iris of the acquired image with the N1 rings of the reference iris to which it is compared. Each coefficient M(i,j) of said comparison matrix codes the result of the comparison between the $i^{th}$ ring of the stored reference iris and the $j^{th}$ ring of the iris of the acquired image by means of said determined and reference iris codes and associated mask codes. Each coefficient M(i,j) of said comparison matrix M can be the result of a transformation LT of the ratio between Dist(i,j,t) and Mask(i,j,t) for a fixed t where:

$$Dist(i,j,t) = \sum_{p=1}^{P} \sum_{f=0}^{F-1} |IC1(i,p+f) - IC2(j,p+t+f)|,$$

$$Mask(i,j,t) = \sum_{p=1}^{P} \sum_{f=0}^{F-1} IM1(i,p+f) * IM2(j,p+t+f)$$

with IC1, IC2, IM1 and IM2, matrices of size N1×(P*F) or N2×(P*F) corresponding respectively to the code of the reference iris, the code of the iris of the acquired image, and the associated mask codes.

The rotation parameter t takes into account rotation of the iris about the axis of symmetry of the eye passing through the centre of the pupil between the acquired image and the reference image, for example due to a different inclination of the head of the individual. Such a matrix can be computed for each value of the rotation parameter t to be taken into account, for example for all the values of t multiples of F in the interval [−T; T] with T a predetermined maximum tolerance to a rotation between the acquired image and the reference image.

The result of the transformation LT can correspond to a level of grey representative of the level of resemblance between the compared rings. By way of example, the transformation can attribute the value 255 for a zero distance between the compared rings and a zero value when the ratio between Dist(i,j,t) and Mask(i,j,t) is less than 0.5. The more similar two compared rings are, the closer a level of grey associated with their comparison will be to white.

Two examples of comparison matrices are illustrated in FIG. 6d and FIG. 6e, FIG. 6d corresponding to the comparison of two eye images having pupil dilation illustrated in FIG. 6a and FIG. 6b, FIG. 6e corresponding to comparison of the eye image of FIG. 6a with the eye image of FIG. 6c having much more pronounced dilation of the pupil. In FIG. 6d the whitest pixels corresponding to the shortest distances between rings are mostly located along the diagonal of the matrix. This is the consequence of a law distortion between the irises of FIGS. 6a and 6b. Each zone of the iris of the acquired image thus approximately corresponds to the zone of the reference iris placed in the same position in the reference image. Inversely, the clearest zones of FIG. 6e are not located on the diagonal of the image, due to the major difference in pupil dilation between images 6a and 6c.

Next, a Viterbi trellis is constructed $106_2$ wherein the cost for each matching of a ring i of the reference iris and of a ring j of the iris of the acquired image is:

for $i = 1$, $$Cost(i,j) = Prob(i,j) * M(i,j)$$

for any $$i > 1: Cost(i,j) = Prob(i,j) * M(i,j) +$$

$$\min_{L=li:ls \text{ and } k=kmin:kmax} (ProbT((i,j),(i-L,j+K)) * Cost(i-L,j+k))$$

with:
li, ls, kmin, kmax predetermined relative integers, with li≥1 and 0<j+k≤N2,
Prob(i,j) a predetermined matching probability of the $i^{th}$ ring of the reference iris and of the $j^{th}$ ring of the iris of the acquired image,
ProbT((i,j),(p,q)) a predetermined matching probability of the $p^{th}$ ring of the reference iris and of the $q^{th}$ ring of the iris of the acquired image, given the matching of the $i^{th}$ ring of the reference iris and of the $j^{th}$ ring of the iris of the acquired image, the function ProbT being also defined so as to send back a high overall value for the combinations of L and k corresponding to non-physical cases such as L=1 and k=1, corresponding to crossmatching, for example the ring j+1 of the acquired image iris matched with the ring i−1 of the iris of the reference image while the ring j of the iris of the acquired image has been matched with the ring i of the iris of the reference image.

Preferably, L=li=ls=1 and (kmin,kmax)=(0,1) or (1,0).

The cost associated with matching two rings (i,j) is a function of the intrinsic probability Prob(i,j) that the $i^{th}$ ring of the reference iris has been moved to the position of the $j^{th}$ ring of the iris of the acquired image due to distortion of the iris engendered by dilation of the pupil in the acquired image. This cost also reflects the degree of similarity between these rings by means of M(i,j). This cost also takes into account the matching set up for a preceding ring of the reference iris so as to respect overall coherence in matching and prevent numerically appealing matchings, but not corresponding to any physical reality, for example matching the $i^{th}$ ring of the reference iris with a highly central ring of the iris of the acquired image, whereas the $i-1^{th}$ ring of the reference image has been associated with a peripheral ring of the iris of the acquired image.

The Prob and ProbT functions can be determined by automatic learning on a base of images of irises photographed at different dilation stages. Alternatively, these functions can be determined analytically by using a distortion model of the texture of the iris such as the model by Clark cited hereinabove. The functions Prob and ProbT can be tabulated as a function of the level of dilation of the pupil.

Such a Viterbi trellis can be constructed for each of the comparison matrices M computed for different values of the rotation parameter t.

Next, a path in each of said Viterbi trellis is determined $106_3$ by:
matching a $M^{th}$ ring of the reference iris with the Path $(M)^{th}$ ring of the iris of the acquired image where Path(M) is the index belonging to [1; N2] minimizing over j (Cost(M,j)), with M an integer less than or equal to the first predetermined number N1, i.e, Path(M)=Argmin$_{j=1:N2}$(Cost(M,j)), with Argmin(x$_i$) the function sending back the index of the minimum value from the series of values x$_i$. This same ring of the reference iris will be the outermost ring of the iris matched with a ring of the iris of the acquired image.

matching at least one other ring of the reference iris of index M' with a ring of the iris of the acquired image of index Path(M'), where M'<M, as a function of a ring of the reference iris of index D already matched with a ring of the iris of the acquired image of index Path(D) with M'=D−Z(D, Path(D), 1) and Path(M')=Path(D)+Z(D, Path(D), 2), the function Z being defined from R$^3$ in R such that Z(i,j,1) and Z(i,j,2) are respectively the integers L∈[li,ls] and k∈[kmin,kmax] minimizing the function ProbT((i,j),(i,−L,j+k))*Cost(i−L,j+)

i.e, (k,L)=Argmin$_{k=kmin:kmax,L=li:ls}$ProbT((i,j),(i−L,j+k))*Cost(i−L,j+k).

Preferably li=ls=1. Giving: M'=D−1 and Path(M')=Path(D)+k
with k minimizing ProbT[(D, Path(D)),(D−1,Path(D)+k)]*Cost(D−1,Path(D)+k)

This matching can be determined successively for several rings of the reference iris by decreasing order of the latter until i=1 or else until Path(i)=1 (the i$^{th}$ ring of the iris of the acquired image, respectively of the reference image, corresponds to the central ring of the reference iris, respectively of the acquired image, which means that dilation of the pupil in the reference image, respectively in the acquired image, has made all the rings corresponding to the rings 1 to i−1 of the acquired image, respectively of the reference image, disappear).

This Viterbi path allows determining a matching minimizing the total cost of the path and therefore corresponding to the most probable matching between the rings of the compared iris, given their similarity and the matching probabilities Prob(i,j) and ProbT((i,j),(p,q)).

Such a path is illustrated in FIG. 7 in which the rounds correspond to the rings of the iris of the acquired image and of the reference iris and in which each cross features matching between one of said rings of the iris of the acquired image and one of said rings of the reference iris.

The matching distance minimized by this matching can be a Hamming distance computed during a computation step 107 by means of the following formula:

$$HD_{Viterbi} = MIN_{t=-T:T} \frac{\sum_{i=1}^{N} Dist(i, Path(i), t)}{1 + \sum_{i=1}^{N} Mask(i, Path(i), t)}$$

with T a predetermined maximum tolerance to a rotation between the acquired image and the reference image.

The resulting matching distance between the two iris images is minimized by way of the Viterbi path selected in the Viterbi graph to retain the most probable matching between the rings of the compared images.

Finally, during a step for identifying and/or authenticating 108, the individual whose image of the eye has been acquired is identified and/or authenticated as a function of the minimized matching distance obtained during computation step 107. The individual can be identified or authenticated if this minimized matching distance is less than a predetermined threshold.

The individual whose image of the iris has been acquired can be identified or authenticated by recognition of his iris while taking into account the non-linear distortion and the appearance or the disappearance of some zones of the iris as a function of the dilation of the pupil, while benefiting from the isotropic nature of this movement, without needing a learning specific to this individual.

The invention claimed is:

1. A method for identifying and/or authenticating an individual comprising the following steps performed by a system for identifying and/or authenticating an individual,
   said system for identifying and/or authenticating an individual comprising a storage device storing at least one binary code of a reference iris obtained from a reference iris image divided into a first predetermined number N1 of concentric rings, and a binary code of associated reference mask identifying regions of the reference iris in which eyelids, eyelashes, reflections or other sources of noise have been detected:
   acquisition of an image of an eye of the individual to be identified and/or authenticated,
   segmentation of the acquired image of the eye so as to isolate a region containing the texture of the iris and determine an associated mask,
   division of said region containing the iris texture and of said mask into a second number N2 of concentric rings,
   normalization of said region containing the texture of the iris and of said mask of Cartesian coordinates into polar coordinates,
   determination of a binary iris code IC of size equal to N2*P*F coding said region containing the texture of the normalized iris and a binary code of mask IM of size equal to N2*P*F coding the associated mask, by application of a third predetermined number of Gabor filters F to each position from a fourth predetermined number P of positions of each ring,
   matching at least one ring of the iris of the acquired image with a ring of one of said reference irises so as to minimize a matching distance between the acquired image and the reference image, said matching distance being obtained from the determined and stored reference iris codes and the associated mask codes by computing a sum of distances between each of said rings of the matched acquired image iris and the ring of the reference iris which corresponds to it,
   wherein said match comprises computation of a comparison matrix M of size N1*N2, each coefficient M(i,j) of said comparison matrix coding the result of the comparison between the i$^{th}$ ring of the stored reference iris and the j$^{th}$ ring of the iris of the acquired image by means of said determined and reference iris codes and the associated mask codes,
   computation of said minimized matching distance,
   identification and/or authentication of the individual if said minimized matching distance is less than a predetermined threshold.

2. The identification and/or authentication method according to claim 1 wherein the matching step implements a Viterbi algorithm.

3. The identification and/or authentication method according to claim 2 wherein the matching step comprises:
   construction of a Viterbi trellis wherein the cost for each matching of a ring i of the reference iris and of a ring j of the iris of the acquired image is:

for $i = 1$, $\text{Cost}(i, j) = \text{Prob}(i, j) * M(i, j)$ for any $i > 1$: $\text{Cost}(i, j) = \text{Prob}(i, j) * M(i, j) +$ $\min_{L=li:ls \text{ and } k=kmin:kmax} (\text{ProbT}((i, j), (i - L, j + K)) * \text{Cost}(i - L, j + k))$ with:
- li, ls, kmin, kmax predetermined relative integers, with li≥1 and 0<j+k≤N2,
- Prob(i,j) a predetermined match probability of the $i^{th}$ ring of the reference iris and of the $j^{th}$ ring of the iris of the acquired image,
- ProbT((i,j),(p,q)) a predetermined match probability of the $p^{th}$ ring of the reference iris and of the $q^{th}$ ring of the iris of the acquired image considering matching of the $i^{th}$ ring of the reference iris and of the $j^{th}$ ring of the iris of the acquired image, determination of a path in said Viterbi trellis comprising:
- matching a $M^{th}$ ring of the reference iris with the Path $(M)^{th}$ ring of the iris of the acquired image where Path(M) is the index belonging to [1; N2] minimizing (Cost(M,j)) over j with M an integer less than or equal to the first predetermined number N1,
- matching at least one other ring of the reference iris of index M' with a ring of the iris of the acquired image of index Path(M'), where M'<M, as a function of a ring of the reference iris of index D already matched with a ring of the iris of the acquired image of index Path(D) with M'=D−Z(D, Path(D), 1) and Path(M')=Path(D)+Z(D, Path(D), 2), the function Z being defined from $R^3$ in R such that Z(i,j,1) and Z(i,j,2) are respectively the integers L∈[li,ls] and k∈[kmin,kmax] minimizing the function ProbT((i,j),(i−L,j+k))*Cost(i−L,j+k).

4. The identification and/or authentication method according to claim 3 wherein computation of the minimized matching distance is carried out by means of the formula $$HD_{Viterbi} = \text{MIN}_{t=-T:T} \frac{\sum_{i=1}^{N} \text{Dist}(i, \text{Path}(i), t)}{1 + \sum_{i=1}^{N} \text{Mask}(i, \text{Path}(i), t)}$$

with:
- T a predetermined maximum tolerance to a rotation between the acquired image and the reference image,
- IC1, IC2, IM1 and IM2, matrices of size N1×(P*F) or N2×(P*F) corresponding respectively to the code of the reference iris, the code of the iris of the acquired image, and the associated mask codes, $\text{Dist}(i,j,t) = \sum_{p=1}^{P} \sum_{f=0}^{F-1} |IC1(i,p+f) - IC2(j,p+t+f)|$, $\text{Mask}(i,j,t) = \sum_{p=1}^{P} \sum_{f=0}^{F-1} IM1(i,p+f) * IM2(j,p+t+f)$.

5. The identification and/or authentication method according to claim 4 wherein each coefficient M(i,j) of said comparison matrix M is the result of a transformation LT of the ratio between Dist(i,j,t) and Mask(i,j,t) for a fixed t.

6. The identification and/or authentication method according to claim 3 wherein the probabilities ProbT and Prob are determined by automatic learning or by using a distortion model of the texture of the iris.

7. The identification and/or authentication method according to claim 3 wherein the probabilities ProbT and Prob are a function of the level of dilation of the pupil.

8. The identification and/or authentication method according to claim 1 wherein said concentric rings vary in thickness.

9. The identification and/or authentication method according to claim 1 wherein at least two of said concentric rings overlap.

10. A non-transitory computer-readable medium containing code instructions for execution of a method for identifying and/or authenticating an individual according to claim 1 when the code instructions are executed by a processor.

11. A data-processing device which is connectable to a storage device storing at least one binary code of a reference iris obtained from a reference iris image divided into a first predetermined number N1 of concentric rings, and a binary code of associated reference mask identifying regions of the reference iris wherein eyelids, eyelashes, reflections or other sources of noise have been detected wherein the data-processing device comprises:
- a communications interface configured to receive an acquired image of an eye of an individual to be identified and/or authenticated;
- a computer configured to:
  - segment the image of the eye received so as to isolate a region containing the texture of the iris and determine an associated mask,
  - divide said region containing the iris texture and said mask into a second number N2 of concentric rings,
  - normalize said region containing the texture of the iris and said mask of Cartesian coordinates into polar coordinates,
  - determine a binary iris code IC of size equal to N2*P*F coding said region containing the texture of the normalized iris and a binary code of mask IM of size equal to N2*P*F coding the associated mask, by application of a third predetermined number of Gabor filters F to each position from a fourth predetermined number P of positions of each ring,
  - match at least one ring of the iris of the acquired image with a ring of one of said reference irises so as to minimize a matching distance between the acquired image and the reference image, said matching distance being obtained from the determined and stored reference iris codes and the associated mask codes by computing a sum of distances between each of said rings of the matched acquired image iris and the ring of the reference iris which corresponds to it,
  - wherein said match comprises computation of a comparison matrix M of size N1*N2, each coefficient M(i,j) of said comparison matrix coding the result of the comparison between the $i^{th}$ ring of the stored reference iris and the $j^{th}$ ring of the iris of the acquired image by means of said determined and reference iris codes and the associated mask codes,
  - compute said minimized matching distance,
  - compare said minimized matching distance to a predetermined threshold.

12. A system for identifying and/or authenticating an individual comprising:
- a storage device storing at least one binary code of a reference iris obtained from a reference iris image divided into a first predetermined number N1 of concentric rings, and a binary code of associated reference mask identifying regions of the reference iris wherein eyelids, eyelashes, reflections or other sources of noise have been detected, an image capture device configured to acquire an image of an eye of the individual to be identified and/or authenticated, a data-processing device according to claim 11 configured to minimize a matching distance, between the acquired image and the reference image, and to identify and/or authenticate the individual if said matching distance is less than said predetermined threshold.

* * * * *